United States Patent [19]
Sudolsky

[11] Patent Number: 6,115,656
[45] Date of Patent: Sep. 5, 2000

[54] FAULT RECORDING AND REPORTING METHOD

[75] Inventor: Michael D. Sudolsky, Huntington Beach, Calif.

[73] Assignee: McDonnell Douglas Corporation, Huntington Beach, Calif.

[21] Appl. No.: 09/248,509

[22] Filed: Feb. 10, 1999

Related U.S. Application Data

[63] Continuation-in-part of application No. 08/877,219, Jun. 17, 1997, abandoned.

[51] Int. Cl.$^7$ .................................................. G01M 17/00
[52] U.S. Cl. ................................. 701/35; 701/36; 701/3
[58] Field of Search ............................... 701/35, 36, 14, 701/29, 3; 340/500, 525, 507

[56] References Cited

U.S. PATENT DOCUMENTS

| | | | |
|---|---|---|---|
| 4,604,711 | 8/1986 | Benn et al. | 364/900 |
| 4,635,030 | 1/1987 | Rauch | 340/52 |
| 4,729,102 | 3/1988 | Miller, Jr. et al. | 364/424 |
| 4,757,454 | 7/1988 | Hisatake et al. | 364/424 |
| 4,788,531 | 11/1988 | Corwin et al. | 340/945 |
| 4,943,919 | 7/1990 | Aslin et al. | 701/29 |
| 5,019,980 | 5/1991 | Starr et al. | 364/424.04 |
| 5,023,791 | 6/1991 | Herzberg et al. | 701/35 |
| 5,218,547 | 6/1993 | Tebbs | 364/424.06 |
| 5,239,468 | 8/1993 | Sewersky et al. | 364/424.03 |
| 5,267,147 | 11/1993 | Harshaw et al. | 364/401 |
| 5,386,363 | 1/1995 | Haak et al. | 364/424.01 |
| 5,442,553 | 8/1995 | Parrillo | 364/424.04 |
| 5,459,660 | 10/1995 | Berra | 364/424.03 |
| 5,500,797 | 3/1996 | Noger | 364/424.04 |
| 5,541,863 | 7/1996 | Magor et al. | 364/580 |
| 5,552,984 | 9/1996 | Crandall et al. | 364/424.03 |
| 5,581,462 | 12/1996 | Rogers | 364/424.012 |
| 5,717,595 | 2/1998 | Cherrington et al. | 364/467.1 |
| 5,729,452 | 3/1998 | Smith et al. | 364/424.03 |
| 5,758,300 | 5/1998 | Abe | 701/33 |

*Primary Examiner*—William A. Cuchlinski, Jr.
*Assistant Examiner*—Arthur D. Donnelly
*Attorney, Agent, or Firm*—Harness Dickey & Pierce P.L.C.

[57] ABSTRACT

A method for recording and reporting fault information pertaining to various components of an aircraft. The method involves recording a diverse plurality of information output from various line replaceable units (LRU's) and other components of the aircraft during takeoff, flight and landing through the use of a bulk storage device, such as an optical quick access recorder (OQAR), on an electronic medium. The electronic medium is then removed from the aircraft after landing and read by an appropriate apparatus. From this information a service technician is able to determine whether or not a fault indication recorded during flight is in fact a legitimate fault requiring the affected LRU to be removed from the aircraft for further diagnostic testing. The method significantly reduces the incidents of no-fault-found diagnostic test results and saves significant man hours which would otherwise be spent testing LRU's and other components which are in fact operating properly. Alternative embodiments of the method disclose making all information from the LRUs available and using multiple overlays to systematically reduce the data to be recorded when the data proves to be too voluminous to record. The prioritizing of information is also disclosed so that LRU data of lesser importance is eliminated from consideration before more important information. The preferred methods minimize on aircraft data interpretation rendering unnecessary on-board maintenance processors and technicians for LRU troubleshooting.

13 Claims, 8 Drawing Sheets

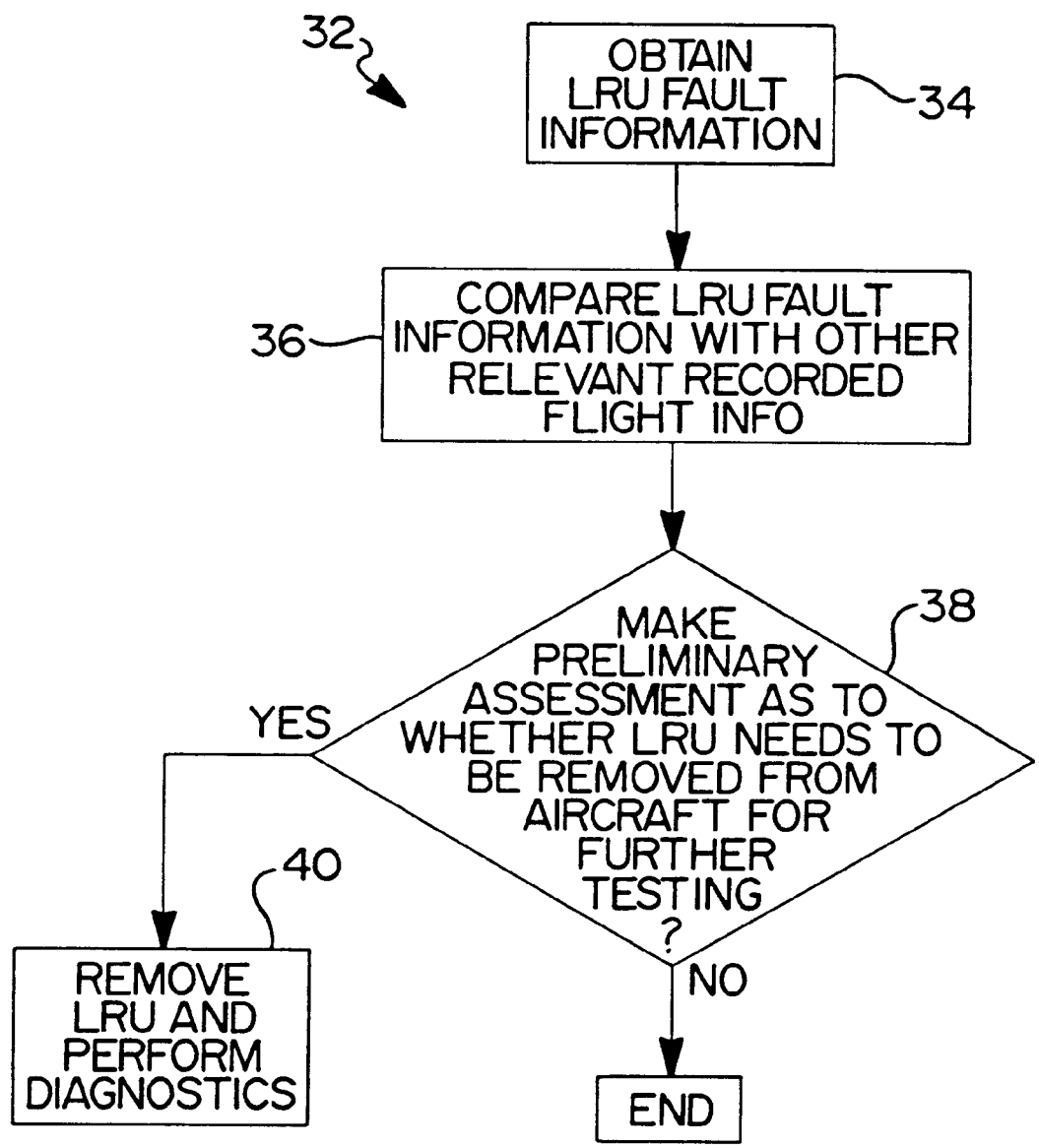

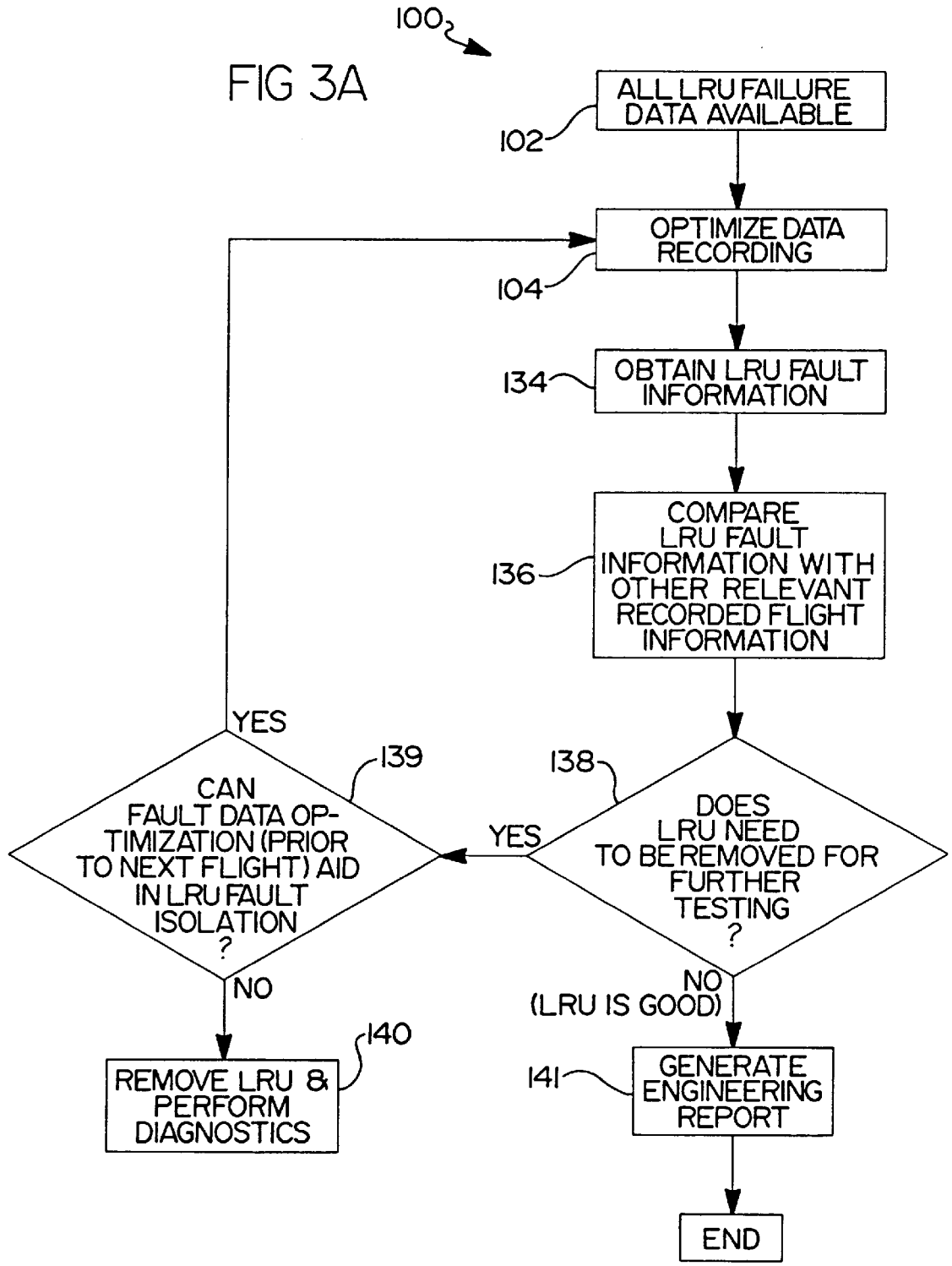

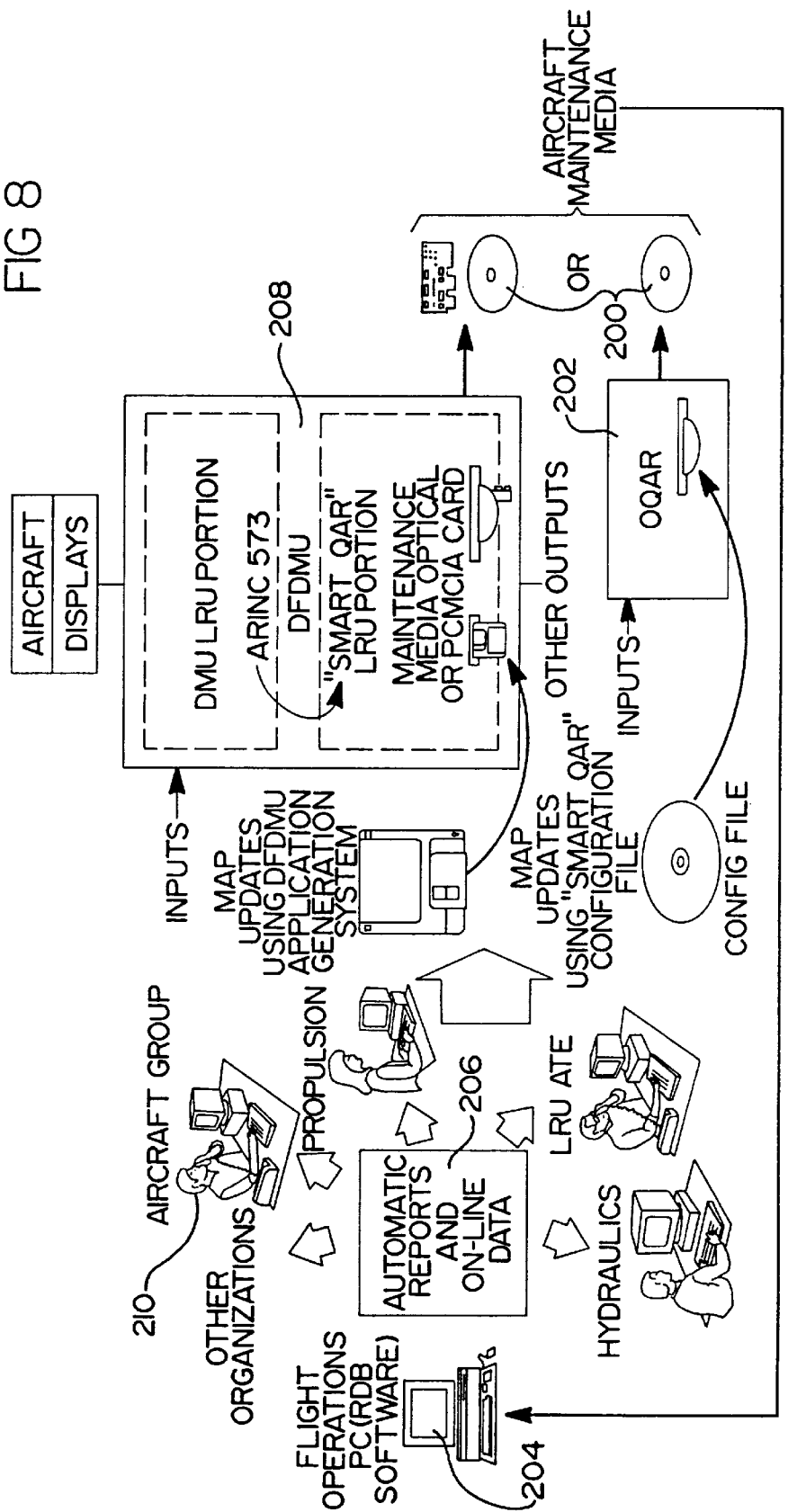

FAULT RECORDING AND REPORTING METHOD

CROSS REFERENCE TO RELATED APPLICATIONS

This application is a continuation-in-part of U.S. application Ser. No. 08/877,219, filed Jun. 17, 1997, now abandoned.

TECHNICAL FIELD

This invention relates to systems and methods for monitoring and analyzing the performance of various components of an aircraft, and more particularly to a method of monitoring, recording, analyzing, condensing when necessary, and automatically reporting a large plurality of information from a plurality of components of an aircraft and making a determination as to whether any one or more of the components has provided a spurious fault indication signal.

BACKGROUND OF THE INVENTION

Background Art

Modern day aircraft, and particularly modern day military aircraft, typically make use of a large number of actuators, sensors, modules and other components. These components produce, or can be monitored to obtain, signals indicative of their performance during takeoff, landing and other aircraft flight phases. Often one or more aircraft components are monitored and/or controlled by a module called a "line-replaceable-unit" (LRU). An LRU is a highly complex module often incorporating several processors for controlling and/or monitoring one or more components or subassemblies of an aircraft. An LRU may be provided to monitor and/or control one or more external devices such as an actuator, valve, motor, etc., associated with a particular component or assembly of the aircraft. An LRU typically also generates output signals which can be monitored to determine if the LRU and/or the component with which it is associated is not operating properly. Examples of some of the LRUs associated with a C-17 aircraft are listed as follows to provide an appreciation as to the wide ranging and diverse functions of a typical military aircraft which the LRU's are responsible for controlling:

| System/Component (AF nomenclature) | Acronym |
| --- | --- |
| Emergency Egress Sequencer | ES |
| Aerial Delivery Locks Control Panel | ADLCP |
| Cargo Delivery System Control-Status Panel | CDSCSP |
| Aerial Delivery System Controller | ADSC |
| Aircraft Fault-Function Indicator Panel | AFFIP |
| Sensor Signal Interface | SSI |
| Antiskid-Brake Temperature Monitor Control Unit | ABTMCU |
| Electronic Engine Control | EEC |
| Electronic Engine Control (for Auxiliary Power) | EEC |
| Auxiliary Power Unit Control Panel | APUCP |
| Environmental System-Fire Detection Control Panel | ESFDCP |
| Temperature Control Panel | TCP |
| Environmental Control System Controller | ECSC |
| Manifold Failure Detection Controller | MFDC |
| Cabin Pressure Controller | CPC |
| Cabin Air Pressure Selector Panel | CAPSP |
| Windshield Anticing Control Box | WAICB |
| Window Defogging Control Box | WDCB |
| Battery Charger | no acronym |
| Generator Control | GC |
| Electrical System Control Panel (Electrical Control Panel) | ECP |
| Static Frequency Converter (60 Hertz Converter) | no acronym |
| Static Power Inverter | no acronym |
| Bus Power Control Unit | BPCU |
| Hi-Intensity Wingtip Lights Power Supply (no AF nomenclature) | no acronym |
| Upper & Lower Beacon Light Power Supply (no AF nomenclature) | no acronym |
| Power Supply-Dimming Unit | no acronym |
| Battery Charger Set (Emergency Lighting Battery/Charger) | no acronym |
| Hydraulic System Controller | HSC |
| Hydraulic System Control Panel | HSCP |
| Fuel System-Engine Start Control Panel | FSESCP |
| Liquid Quantity Indicator | LQI |
| Ground Refueling Control Panel | GRCP |
| Fuel Quantity Computer | FQC |
| Fluid Purity Controller | FPC |
| Bearing-Distance-Heading Indicator | no acronym |
| Engine-Thrust Rating Panel Display | ETRPD |
| Signal Data Recorder (Quick Access Recorder) | no acronym (QAR) |
| Standard Flight Data Recorder | SFDR |
| Propulsion Data Management Computer (Aircraft Propulsion Data Management Computer) | PDMC (APDMC) |
| Flight Control Computer | FCC |
| Actuator Flight Control Panel | AFCP |
| Automatic Pilot Control-Indicator | APCI |
| Ground Proximity Warning Control Panel | GPWCP |
| Spoiler Control-Electronic Flap Computer | SCEFC |
| Display Unit (Multi Function Display) | DU (MFD) |
| Multifunction Control Panel | MCP |
| Air Data Computer | ADC |
| Inertial Reference Unit | IRU |
| Head-Up Display Unit ("Glass-cockpit" Display) | HUDU |
| Digital Computer (Mission Computer) | DC (MC) |
| Display Unit (Mission Computer Display) | (DU) (MCD) |
| Data Entry Keyboard (Mission Computer Keyboard) | DEK (MCK) |
| Intercommunications Set Control | ICSC |
| Intercommunications station | no acronym |
| Audio Frequency Amplifier | no acronym |
| Public Address Set Control | no acronym |
| Cordless Headset | no acronym |
| Radio Receiver-Transmitter | no acronym |
| CargoWinch Remote Control | no acronym |
| Battery Charger | no acronym |
| Communication-Navigation Equipment Control | CNEC |
| Communications Equipment Control | CEC |
| Central Aural Warning Computer | CAWC |
| Warning And Caution Computer | WACC |
| Warning and Caution Annunciator Panel | WACAP |
| Signal Data Converter | SDC |
| Coder Decoder Keying Device | CDKD |
| Transponder Set Test Set (I-Band Transponder Test Set) | no acronym (TTU) |

It will also be appreciated that aircraft such as the C-17 aircraft include a wide variety of actuators and sensors that provide output signals that can be monitored and recorded, but which do not have an LRU associated therewith. These components include, but are not limited to electrical and electromechanical actuators, valves, transducers, sensors, etc. Thus, it will be appreciated that most modern day aircraft, and especially modern-day military aircraft, have an extremely wide number of diverse components which are monitored to help insure proper operation.

With previously developed monitoring and testing systems, information from the LRU's and other components of an aircraft have been recorded on a quick access recorder (QAR). The quick access recorder records the information from the various LRU's and other components which are being monitored and stores the monitored information on a magnetic tape storage medium. Due to the inherent limitations of all magnetic storage media, some of the stored information may become corrupted. In some instances this might lead to inconclusive or erroneous fault indications should the magnetic storage medium indicate that, for example, a particular LRU has provided output signals indicating that a component associated therewith is malfunctioning when it is not.

Various systems for recording and/or analyzing operational parameters of various LRU's and other components of an aircraft are disclosed in the following U.S. patents, the disclosures of which are hereby incorporated by reference:

| | |
|---|---|
| 4,943,919 | 4,635,030 |
| 5,019,980 | 4,729,102 |
| 5,218,547 | 4,788,531 |
| 5,267,147 | 5,500,797 |
| 5,386,363 | 5,541,863 |
| 4,604,711 | 5,552,984 |

More recently, an optical quick access recorder (OQAR) has been used on board aircraft to record the information output by the LRU's and other components of the aircraft on an optical storage medium such as a high density optical storage disc. The optical storage disc tends to be far less susceptible to corruption than magnetic storage media and can hold a much greater amount of information than can be held by magnetic storage media. This has enabled even more information to be recorded (much of it in real time) pertaining to the various operational parameters of the aircraft and the performance of the wide ranging and numerous components, sensors and actuators of the aircraft than was possible with magnetic storage media.

Up until the present time, information recorded by the optical quick access recorder has only been used to generate information which indicates whether or not signals from the LRU's and other components of the aircraft are indicating fault conditions. Put differently, the information provided by the optical quick access recorder has not been used to determine if the fault indication is in fact a spurious fault indication. Up until the present time, information obtained from the optical quick access recorder generally has required highly trained service personnel to first interpret that a fault condition exists with a certain LRU or other component of the aircraft, and then either perform on-board testing that utilizes the aircraft as a test device or physically remove the effected component from the aircraft for diagnostic testing. Sometimes, diagnostic testing may not identify a problem with the LRU or other component. Often, the diagnostic testing of a removed LRU can consume several hours by a highly trained service person in an effort to determine the cause of the fault indication. In some instances, the effected LRU or component is eventually reinstalled in the aircraft without ever being able to determine what caused the initial fault indication. This has led to high "cannot duplicate" ("CND") and/or "no-fault-found" ("NFF") rates for various LRU's and other components.

Two challenges have underscored the high NFF rate: 1) the same LRU often makes repeated back-shop visits and can lead to "intermittent failure" troubleshooting (Intermittent testing often results in days of troubleshooting since a several hour fault detection test is repeated several times); or 2) Service personnel may become sensitized to repeated NFF test results. Since testing of an LRU or other component may take considerable effort using specialized equipment and skills, it will be appreciated that significantly reducing the incidence of no-fault-found results of diagnostic tests can represent a very significant cost savings. The following table illustrates test times required for determining if a fault condition exists for 38 LRU's of the C-17 aircraft by McDonnell Douglas using automatic test equipment.

| LRU Name | LRU Acronym | LRU ETE Run Time (From technical order, includes the 10 Minute Setup/Teardown time) |
|---|---|---|
| Aerial Delivery Locks Control Panel | ADLCP | 28 min. |
| Cargo Delivery System Control-Status Panel | CDSCSP | 52 min. |
| Aerial Delivery System Controller | ADSC | 40 min. |
| Sensor Signals Interface | SSI | 30 min. |
| Antiskid Brake Temp Monitor Control Unit | ABTMCU | 40 min. |
| Electronic Engine Control | EEC | 40 min. |
| Environmental System-Fire Detection Control Panel | ESFDCP | 80 min. |
| Environmental Control System Controller | ECSC | 160 min. |
| Manifold Failure Detection Controller | MFDC | 50 min. |
| Hydraulic System Controller | HSC | 60 min. |
| Hydraulic System Control Panel | HSCP | 40 min. |
| Fuel System-Engine Start Control Panel | FSESCP | 60 min. |
| Liquid Quantity Indicator | LQI | 22 min. |
| Ground Refueling Control Panel | GRCP | 78 min. |
| Fuel Quantity Computer | FQC | 103 min. |
| Fluid Purity Controller | FPC | 60 min. |
| Engine Thrust Rating Panel Display | ETRPD | 31 min. |
| Propulsion Data Management Computer | PDMC | 50 min. |
| Flight Control Computer | FCC | 316 min. |
| Actuator Flight Control Panel | AFCP | 36 min. |
| Automatic Pilot Control Indicator | APCI | 120 min. |
| Ground Proximity Warning Control Panel | GPWCP | 40 min. |
| Spoiler Control-Electronic Flap Computer | SCEFC | 280 min. |
| Display Unit | DU | 210 min. |
| Multifunction Control Panel | MCP | 60 min. |
| Air Data Computer | ADC | 114 min. |

-continued

| LRU Name | LRU Acronym | LRU ETE Run Time (From technical order, includes the 10 Minute Setup/Teardown time) |
|---|---|---|
| Head-Up Display Unit | HUDU | 180 min. |
| Digital Computer | DC | 219 min. |
| Display Unit | DU | 35 min. |
| Data Entry Keyboard | DEK | 40 min. |
| Intercommunications Set Control | ICSC | 27 min. |
| Communication-Navigation Equipment Control | CNEC | 35 min. |
| Communications Equipment Control | CEC | 80 min. |
| Central Aural Warning Computer | CAWC | 50 min. |
| Warning And Caution Computer | WACC | 44 min. |
| Warning and Caution Annunciator Panel | WACAP | 25 min. |
| Signal Data Converter | SDC | 315 min. |
| Coder Decoder Keying Device | CDKD | 180 min. |

It would therefore be highly desirable to provide some method of analyzing and automatically reporting information for making a preliminary determination as to whether a fault indication provided by an LRU or other component of an aircraft is in fact a legitimate fault indication which will require further diagnostic testing of the LRU or affected component, or which is a spurious fault indication. In the case of a spurious fault indication, the LRU or component under investigation would not have to be either tested on-board the aircraft utilizing the aircraft as a test device or removed from the aircraft and subjected to several hours of testing in an effort to duplicate the fault condition or to find a malfunctioning subcomponent or subassembly of the LRU or other component. Accordingly, such a method could significantly reduce the instance of wasted man hours attributed to both on and off-aircraft testing of LRU's and other components of an aircraft which are, in fact, in perfect working order, but which have provided output signals which may indicate that same are not operating properly.

It would also be highly desirable to provide a method for recording and analyzing information from a bulk storage device, which provides user readable information enabling service personnel to quickly determine whether various LRU's and other components of an aircraft are operating within acceptable operating parameters without the need for using a variety of different computers and equipment, and without the need for requiring computers to be taken on board the aircraft to download information from various on-board computers of the aircraft.

It would also be desirable to provide a method for recording and analyzing information from an aircraft which can quickly enable service personnel to determine if one or more LRU's of the aircraft or other components need to be removed for further diagnostic testing, and which also enable qualified service personnel to quickly determine if information from an LRU or other component which appears to suggest a fault condition is in fact explained by the presence of other signals which verify to the service person that no fault condition exists with the particular LRU or component under investigation. Most preferably, this failure filtering technique would be automatically reported to service personnel.

It would also be highly desirable to provide a method for automatically condensing what is recorded, as necessary. Current maintenance recorder maps have finite memory capacities and preclude the (real-time) capture and recording of all available fault data. This has often prevented a significant portion of LRU fault data from being recorded since a minority amount of LRU data can fill the entire maintenance recorder map space. Therefore, a method that automatically condenses what is recorded and automatically updates any condensing as needed, can support the above desirable method reporting while finite recorder map limitations exist.

SUMMARY OF INVENTION

The above and other objects are provided by a preferred fault recording and reporting method in accordance with the present invention. The method involves using a mass storage device such as an optical quick access recorder (OQAR), wherein the electronic medium is easily removed from the aircraft without requiring aircraft power or specialized equipment or skills. The electronic medium monitors and records a large and diverse plurality of output signals from line replaceable-units (LRU's), actuators, valves, sensors and other various components of an aircraft (in real time). Information is recorded on an optical storage disc which is read by an appropriate optical disc reader associated with a personal computer after a mission flight is accomplished. The information is manipulated by software in the personal computer and presented to the user in a user-friendly format allowing the user to quickly verify whether or not a recorded fault indication is in fact a legitimate fault. By making an automated determination immediately after the flight or mission is accomplished, significant time can be saved by avoiding on-board testing or manually removing one or more LRU's or other components from the aircraft and performing extensive testing merely because a component has provided a signal during flight which is indicative of a fault condition, but which component is, in fact, operating correctly.

The method of the present invention permits a user to view a report from recorded mass storage device data made during a flight which would indicate that a fault condition exists, but which because of other recorded information presented to the user, would indicate to the user that in fact no fault condition occurred. Thus, it can be determined, before any service operations are performed on the aircraft, which components in fact do need to be removed for further testing and/or service and which components may be operating satisfactorily regardless of fault indication signals that they may have provided during a flight. The method of the present invention can therefore serve to drastically reduce the no-fault-found occurrences typically experienced with present day diagnostic and servicing procedures.

In an alternative preferred method of the present invention all of the available fault information is made available for recording by an optical quick access recorder (OQAR), and one or more overlays are created to significantly, but selectively, reduce the amount of data for recording if the data is too voluminous to record on the OQAR recording medium. The overlays are used to combine similar types of fault information generated by one or more LRUs when the fault information proves to be too voluminous to record by creating coded overlay words which are recorded together with the reduced (i.e., condensed) data of the LRU or LRUs.

The prioritizing of parametric data generated by one or more LRUs is also disclosed such that non-critical parametric data can be disregarded (i.e., not recorded) in the event the parametric data proves to be too voluminous to record, even after one or more overlays have been created in an effort to reduce the data to a quantity that permits recording on an OQAR recorder medium. Also disclosed are algorithms for handling wire test data and self test data and creating overlays when such data proves too voluminous to record. Finally, all of the disclosed overlay algorithms support automatic updating, as needed, for continual improvement to CND (cannot duplicate), NFF, and test-time rates.

BRIEF DESCRIPTION OF DRAWINGS

The various advantages of the present invention will become apparent to one skilled in the art by reading the following specification and subjoined claims and by referencing the following drawings in which:

FIG. 2 is a flowchart illustrating the steps of a preferred method of the present invention;

FIGS. 3A and 3B illustrate a flowchart in accordance with an alternative preferred method of the present invention in which all LRU failure data is made available for recording and post recording review of the recorded information performed to optimize the recording of fault data;

FIG. 8 is a flowchart illustrating the overall implementation of the alternative preferred method of the present invention to create a closed loop monitoring system by which recorded fault data is used to optimize subsequent flight operations of an aircraft.

DETAILED DESCRIPTION OF THE INVENTION

Figure 1:
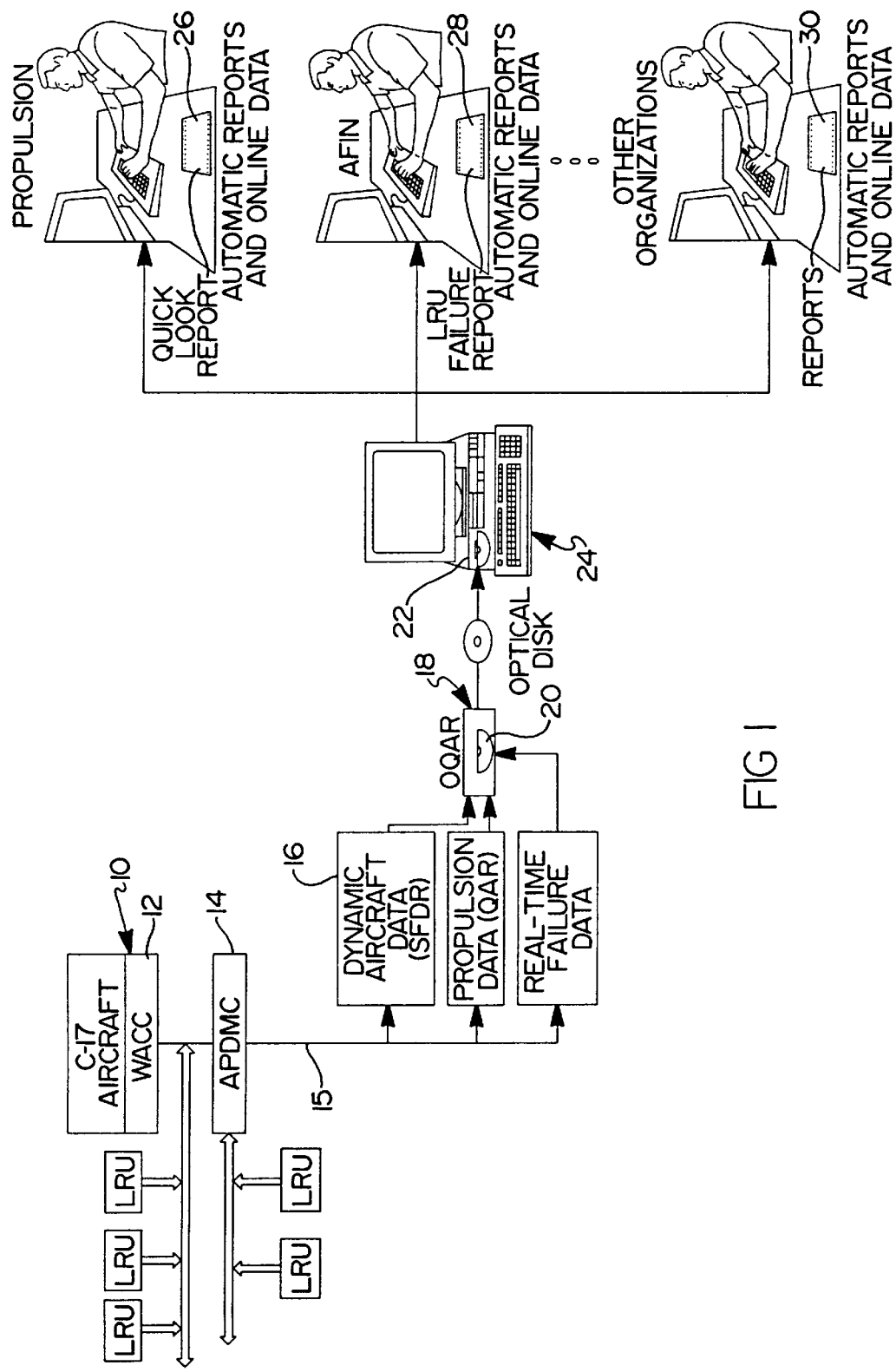
FIG. 1 is a simplified diagram illustrating the various components used with the method of the present invention.

Referring to FIG. 1, the various components typically used with the method of the present invention are illustrated. The aircraft is denoted as a C-17 military aircraft 10, although it will be appreciated immediately that the preferred method of the present invention is applicable to virtually any commercial or military aircraft, as well as other non-fixed wing aircraft. The method of the present invention could also easily be used with little or no modification to evaluate fault indications provided by various components or computers of other military vehicles including, but not limited to, tanks.

The aircraft 10 includes a "Warning And Caution Computer" (WACC) 12 which supplies Warning and Caution System (WACS) bus signals to an "Aircraft Propulsion And Data Management Computer" (APDMC) 14. The WACS bus contains signals from many LRU's, such as an Antiskid-Brake Temperature Monitor Control Unit (ABTMC) and Fuel Quantity Computer (FQC). The APDMC 14 is commercially available such as from Teledyne Controls Corporation, Los Angeles, Calif. and is more commonly called a data memory unit (DMU) in industry commercial applications. The APDMC 14 also monitors mission bus signals from the mission computer, and the mission bus contains signals from many aircraft LRU's. Note that a DMU is used for monitoring many busses, as well as analog and discrete sensor signals which do not have an LRU or communication bus associated therewith. The APDMC 14 monitors a very large and diverse plurality of operating parameters of the aircraft and generates a plurality of output signals indicative of the operation of the various line-replaceable-units (LRU's) and other diverse components of the aircraft. Examples of other components which the APDMC 14 can monitor are listed in the "Background" portion of this document.

The APDMC 14 generates a large plurality of output signals which can be representative of dynamic aircraft data, propulsion data and real-time fault data. The dynamic aircraft data is recorded in a standard flight data recorder (SFDR) 16, as is well known in the aircraft industry. The APDMC 14 transmits output data that ARINC 573 bus 15 can be recorded on an optical quick access recorder (OQAR) 18 on an optical storage medium 20. The OQAR 18 is also a commercially available item available such as from Teledyne Controls Corporation. The use of an optical disc for storage greatly increases the data storage capacity while significantly reducing the amount of lost data which could otherwise be experienced with a magnetic storage medium which is susceptible to drop outs and other well known limitations. The optical storage disc 20 has a storage capacity of at least about 120 mb, and preferably about 230 mb or higher.

The APDMC or DMU can be used to monitor any aircraft parameter for optical disk recording, and the present invention exploits two data recording capabilities for NFF minimization: (1) multiple maps or overlays support the recording of subassembly or detail failure data, and (2) recent DMU developments support maintenance updates of which parameters are optically recorded using an Application Generation Station (AGS). The AGS is also a commercially available item available such as from Teledyne Controls Corp. These two capabilities support the routing of increased LRU failure data and other aircraft parameters by maintenance personnel for enhancing the utility of the present invention. This enhancement forms the basis for the alternative preferred method described in detail for FIGS. 3–8.

After the flight of the aircraft 10 has concluded, the optical disc 20 is removed from the OQAR 18 and read by an optical disc reader 22 associated with a personal computer 24. The personal computer 24 is used with conventional data base software such as "FoxPro®" available from Microsoft Corporation. The software is used to generate a database of information from which reports are generated relating to propulsion data recorded during flight, avionics flight instrument and navigation (AFIN) reports indicating faults with various LRU's and other components of the aircraft 10, and other information relating to the particular flight such as altitude, aircraft speed, etc. over the course of the flight. It is a principal advantage of the method of the present invention that a high performance personal computer 24 is used to generate a large database of user readable information from which reports can be compiled which can be quickly read and interpreted by qualified service personnel or technicians familiar with the various operating components of the aircraft 10. The automated reports 26–30 generated by the personal computer 24, being in user readable form, allow various individuals responsible for maintaining proper operation of the various LRU's and components of the aircraft 10 to determine quickly and easily, after a mission flight is concluded, the pertinence of the information collected during the flight, and whether any LRU or other component has provided output signals indicating that same is not functioning properly.

With previously developed systems, several independent computers and several independent software programs were typically used to compile the information, in user readable form, necessary to make a determination as to whether or not one or more LRU's or other components had generated a fault signal. Typically, a "ground read-out equipment" (GRE) portable computer is required to download data from the SFDR. A dedicated lap top computer was also required for downloading information recorded in a mission computer (MC) of the aircraft. This required a highly-skilled technician to board the aircraft after the flight and manually couple a computer to either the mission computer or SFDR to obtain recorded LRU fault information or aircraft dynamic data, respectively. LRU subassembly failure data can also be downloaded from the LRU's by the use of numerous different interconnecting devices, such as power supplies, air-cooling and loads, and computers. Propulsion data was also generated independently through separate software. Thus, it will be appreciated that a significant degree of time was required by highly-skilled service persons, as well as numerous independent computer components, before the necessary information could be obtained for determining whether or not one or more LRU's or other components have provided spurious fault indications during a just-completed flight. The step of using the personal computer 24 has virtually eliminated the necessity of having several service technicians board the aircraft 10 after a flight with various types of equipment to obtain the information needed to make determinations as to how the various components of the aircraft 10 performed during the flight.

Referring now to FIG. 2, a flow chart 32 is shown which illustrates the steps of the preferred method of the present invention. Following a flight, the relevant information relating to reported LRU and other component faults is obtained, as indicated at step 34 and results in generating the automated reports 28 via personal computer 22 in FIG. 1. This step involves making a determination if sufficient LRU fault data and other parameters have been recorded for NFF minimization. If not, maintenance personnel can attempt to supplement the recorded data with other information related to a particular aircraft in an effort to generate sufficient data to make a determination regarding the operation of various components being evaluated. This supplementing of information is an important feature of the closed loop monitoring described in detail for FIG. 8, in connection with the alternative preferred method of the present invention.

The obtained LRU fault information is then compared with other relevant recorded flight information by the service technician or automatically by software, such as FoxPro®, as indicated at step 36, whenever appropriate, in an effort to determine why the fault indication may have occurred. For example, a fault indication may have been provided at a certain time during the flight which indicates that the aircraft's altimeter malfunctioned temporarily or intermittently. However, a qualified aircraft service technician would also understand that the altimeter would not function properly if the aircraft was subjected to a roll of, for example, more than 30° during flight. In this example, the flight service technician could review other information provided in report form, such as by report 30 in FIG. 1, to determine that at a certain time during flight the aircraft 10 experienced a roll of more than 30° for a limited time or at several times during flight. From this information, the service technician could readily determine that the fault indications provided relating to the altimeter are in fact spurious fault indications and that the altimeter, in fact, operated properly during the entire flight of the aircraft 10. The preferred embodiment of the said invention could alternatively automatically report this to the service person.

Referring further to FIG. 2, the service technician makes a determination from the comparison carried out at step 36 as to whether or not any LRU or other component needs to be physically removed from the aircraft for further diagnostic testing and/or repair, as indicated at step 38. If this determination produces a "no" answer, then no further action is needed by the service technician. If the answer is "yes" to the test at step 38, the service technician knows that the fault indication is a legitimate fault indication, and the affected LRU or component is removed for diagnostic testing, as indicated at step 40. Note that following LRU or component removal, the fault data can be used to aid in off-aircraft troubleshooting.

By the method of the present invention, the incidents of no-fault-found diagnostic results can be significantly reduced. The method of the present invention provides service personnel with the information needed to quickly determine whether recorded fault indications during the flight of an aircraft are in fact legitimate fault indications or whether they occurred due to other in-flight circumstances which would have understandably affected the LRU or component which generated the fault indication. The method of the present invention thus can save significant man hours which would otherwise be expended by testing components or LRU's which have generated fault indications, which are ultimately determined to be operating satisfactorily. Most important, the preferred embodiment of the present invention supports automatic NFF filtering reporting.

Figure 3B:
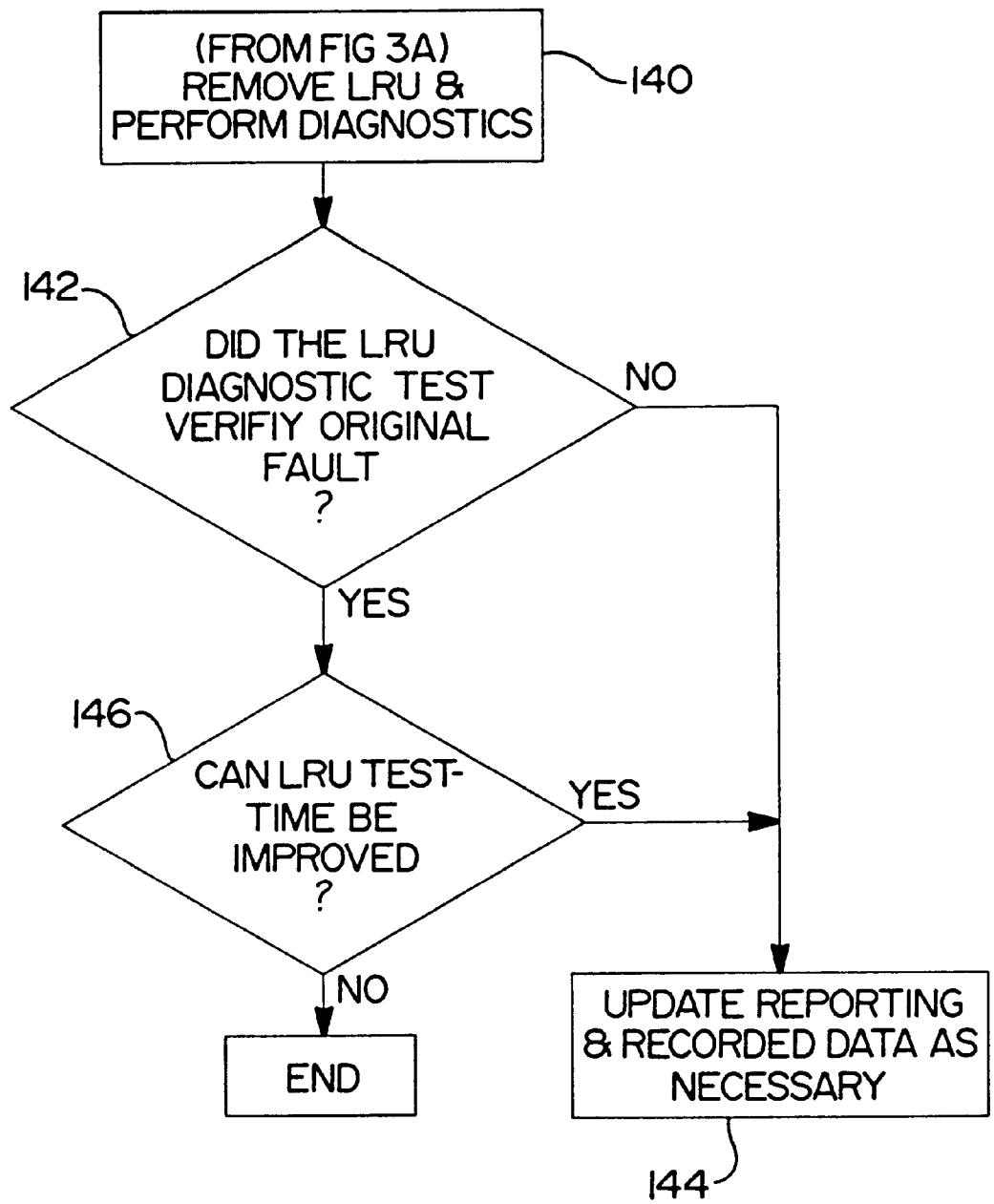

Referring to FIGS. 3A and 3B, a flowchart in accordance with an alternative preferred method 100 of the present invention is shown. Steps in common with the method set forth in FIG. 2 are denoted by the same reference numerals as used in FIG. 2 but increased by 100.

Figure 4:
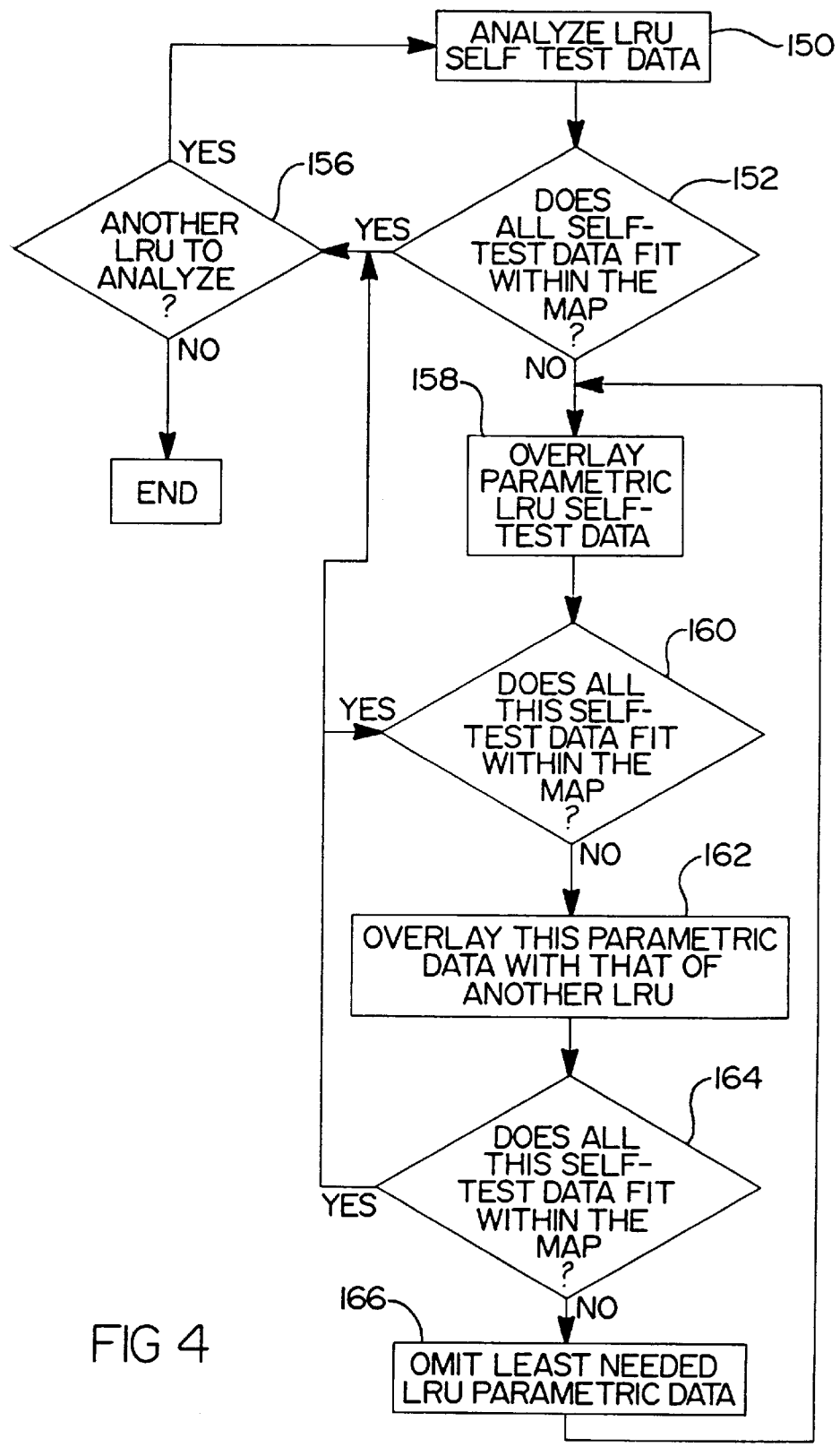
FIG. 4 is a flowchart of the steps taken in creating one or more overlays, as needed, when all of the available information from an LRU for recording is too voluminous to be recorded by the data recorder.
Figure 5:
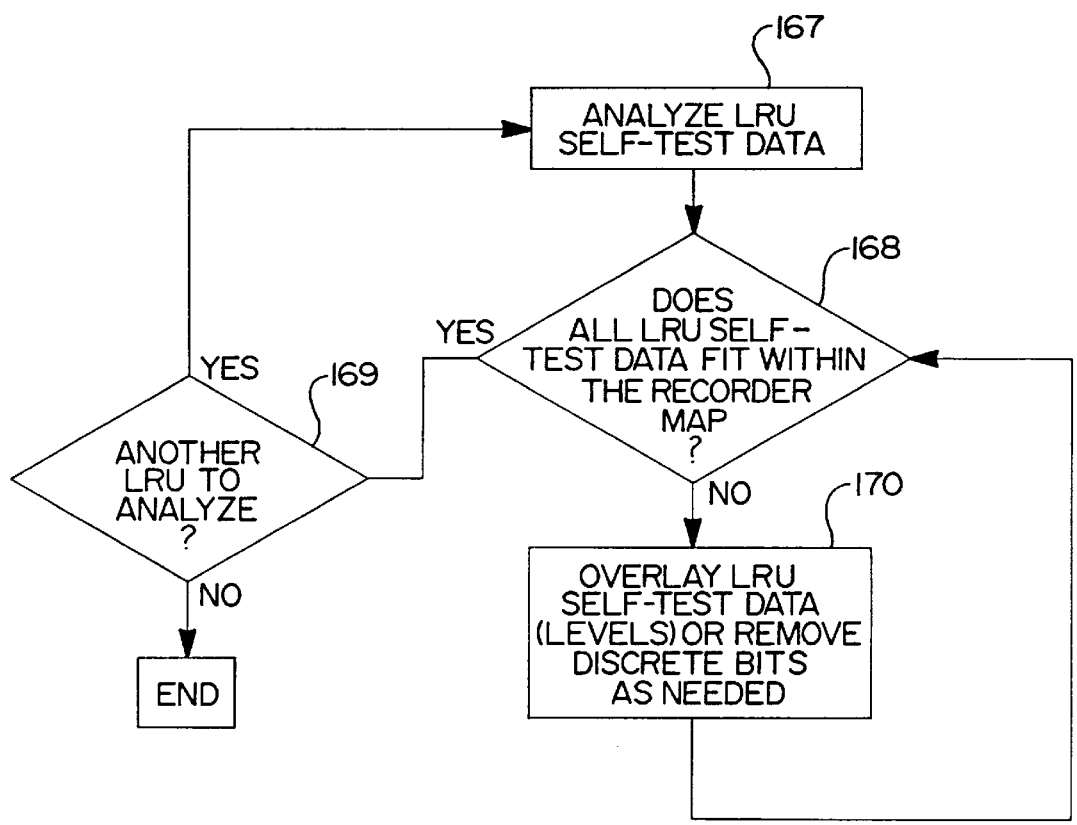
FIG. 5 is a flowchart illustrating an algorithm for analyzing self-test information generated by an LRU and determining if an overlay needs to be created before same can be recorded.

The method 100 of FIGS. 3A and 3B involves initially making all failure data from each LRU available for recording, as indicated at step 102. For example, three hundred data words per second can be available from an LRU communication bus (MIL-STD-1553 or ARINC 429 are commonly used in the industry) for maintenance recording. This failure data is then "optimized", as step 104, which essentially involves making automated determinations as to which failure data will be recorded and which will not. This step is outlined in greater detail in connection with the flowcharts of FIGS. 4–7, and this example LRU will be used for FIGS. 4 and 5 using one hundred and two hundred maintenance recorder data words per second, respectively. Essentially, however, the step 104 determination is made based on the life-cycle cost of the LRU vs. that of the others. If the LRU generating the failure data is a costly LRU, and therefore one that will generate a significant cost if it is replaced and repaired, then the preference is to record all of the fault information generated by the LRU. This enables service technicians to automatically receive reports from the fault data of such an LRU before simply replacing it, which would cause a significant cost to be incurred. If the LRU is not a costly LRU, then further determinations, outlined in FIGS. 4 and 5, are made to reduce the amount of fault data generated to a point where data can be readily recorded in the memory map of the maintenance recorder media. Most important, the techniques disclosed in FIGS. 3A and 3B reporting and FIGS. 4–7 fault data "optimization" support continuous preferred alternate method improvement, as described in greater detail in connection with FIG. 8.

Steps 134, 136, 138 and 140 correspond directly to steps 34–40, respectively, of FIG. 2. Step 141 involves making an automated engineering report in the event the LRU is found to have no fault to therefore support aircraft operation improvement. Step 139 entails automatically reporting if LRU fault isolation can be improved by further optimizing the fault data (prior to the next flight). Usage of step 139 is outlined in greater detail in connection with the FIG. 6 flowchart.

Step 142 involves automatically reporting if the performance (and diagnostic) test(s) of the LRU which has generated a fault verifies the original aircraft fault, and therefore if the original reported fault indicates a legitimate hardware problem with the LRU. If a "no" answer results at this step, then it is determined that an LRU was incorrectly removed. This can occur for two reasons: 1) an incorrect preliminary assessment was made (i.e., the recorded data was reported erroneously and indicated a fault when none existed) or 2) the LRU did not have all its associated fault data recorded due to recording constraints, such as maintenance recorder memory map or bus throughput limitations. For the incorrect preliminary assessment, step 144 leads to an update of the step 138 reporting, or, more likely, the LRU will not have all associated fault data recorded and step 104 data recording optimization will be needed in connection with updated assessment reporting (138). This step 144 usage is outlined in greater detail in connection with the FIG. 5 flow chart.

If the test at step 142 produces a "yes" answer, then an assessment is made at step 146 to determine if the LRU test-time can be improved. The Background Art section discussed lengthy End To End test times, and the considerably longer time often required for intermittent failure detection. Step 146 addresses this testing challenge, and the FIG. 5 discussion describes this step in greater detail.

Referring to FIGS. 4 and 5, a method of using "overlays" to record large amounts of pertinent fault information is shown. The use of multiple maps and overlays in recording the subassembly LRU failure data was discussed earlier, and is described in detail for the FIG. 5 flow chart. It will be appreciated that the use of an overlay, per se, is known in the art. However, the method disclosed in FIG. 4 makes use of one or more overlays to optimize LRU data recording when the LRU generates more data than can be recorded within the maintenance recorder map. Additionally, the FIG. 5 flowchart discloses how the self-test complexity of a modern LRU is best used to aid in fault recording and reporting.

Before addressing the flowcharts of FIGS. 4 and 5, it should be appreciated that the number of data words generated from diagnostic data of even a minority of the LRUs on board on an aircraft can result in a minority of the LRUs filling the entire memory map of a maintenance recorder. For instance, the example LRU has 100 and 200 data words per second available for FIGS. 4 and 5 recording, respectively, therefore the 300 words for this LRU can occupy the majority for a 512 word map. It will also be appreciated that a 12 bit QAR word can record a parameter range from 0 to 4095 with a LSB weight of 1. If the 12 bit LSB weight is a value of 10 or 0.1, the maximum value becomes 40,950 or 409.5, respectively. A 12 bit word can use a sign bit, and with an LSB weight of "1" its recording range is +/−2,047. The sign bit is used to make the remaining 11 bits negative or not. A parameter can also be recorded at various rates if desired. Faster rates require increased map space (i.e., more memory). For example, a 12 bit parameter recorded 16 times per second requires 16 map words. Lastly, a 12 bit QAR word is often utilized for 12 LRU test results, indicating a pass or fail result by either setting a bit or not.

FIG. 4 illustrates an example of an alternative preferred method of the present invention which makes use of overlays and LSB weights and recording rates for more effectively sharing storage space on the maintenance recorder storage media. In this example, overlay word construction is used to dictate how 26 maintenance recorder words are used for space-sharing 100 words of parametric data which are generated by an LRU.

Referring to step 150, the LRU self-test data is analyzed, and then a determination is made if the data generated will fit within the memory map of the maintenance recorder, as indicated at step 152. If it will, meaning that there is clearly sufficient memory space available to record the entire data output from the LRU, then it is determined if another LRU needs to be analyzed, as indicated at step 156. If the inquiry at step 156 produces a "no" answer, then no further action is taken. If the answer is a "yes", then step 150 is re-executed.

If the inquiry at step 152 produces a "no" answer, as will occur for many LRU's since even a minority of information from an LRU can fill the entire maintenance recorder map, then overlays are created for the parametric self-test data generated by the example LRU, as indicated at step 158. This involves utilizing LSB weights and recording rates for space sharing optimization, as described above, to reduce the example 100 words of LRU data to 26 words. The example LRU can have internal clock speed and other parametric data from each of four different circuit boards. It would be desirable to record the clock and other circuit board parameters continuously, but this can be difficult or impossible in view of the large amount of data that can be generated. Step 158 takes into account LRU factors such as redundancy and complimentary operation that contribute to only one of the four circuit boards actually generating output signals controlling aircraft performance at any given time. This can be the case for two pairs of redundant circuit boards, where only one board within a redundant pair generates aircraft operational output signals at any given time and the pairs are complimentary. As an example, one pair may be used during aircraft climb and the other during descent. Thus, a coded overlay word consisting of three bits dictates which circuit board parametric data (of the four) is being recorded at any given time. The net effect is that 26 words are now required for recording, or roughly one-fourth the total available parametric data plus the overlay word at step 158. It will be noted that other factors can result in either half of the available parametric words being used initially, or an overlay from two of the example LRU circuit boards being recorded, or no overlay attempts made at all.

At step 160, a determination is made if the parametric LRU self-test data will fit within the memory space of the memory map of the OQAR. If the answer is "yes", then the self-test data is recorded and step 156 is again executed.

If the answer at step 160 is "no", then this LRU parametric data is overlayed with data of another LRU, as indicated at step 162. This degree of overlaying involves further selectively reducing the self test data generated by the initial LRU of this example and the new LRU by sharing the new LRU's recorded data with the initial LRU. The new LRU can have an overlay similar to that just attempted at step 158 for the initial LRU, but it generates aircraft operational output signals only during ground operations. Thus, the new LRU overlay can be further shared with the initial LRU (climb/descent) overlay at step 162.

At step 164, another determination is made if the new overlays created at step 162 will fit within the memory map of the maintenance recorder. If they will, then the information is recorded and another LRU is analyzed, as indicated at step 156. If not, then a pre-designated, least most important LRU parameter is removed, as indicated at step 166, and further overlays are again created and another attempt is made at recording the remaining LRU parametric data, as indicated at steps 158–164. Step 166 causes information relating to one parameter at a time to be removed, in an effort to enable overlays to be created which have a sufficiently limited number of data words such that same can be recorded in the memory map space available on the OQAR. In this regard it will be appreciated that each parameter of operation of an LRU for which parametric data is generated can be assigned a "priority". This enables that information which is predetermined to be least important or critical to the operation of the aircraft to be eliminated in accordance with the pre-established priority designations.

The steps of the FIG. 4 flowchart are also used to construct overlays of discrete self-test data. The example LRU can have 200 self-test discrete words available for recording, as discussed earlier for FIG. 3, step 102. Each of the four circuit boards for the example LRU can contain 30 components, and each component can execute 20 self-test functions at an average rate of once per second. This complex and voluminous LRU self-test data thus requires 200 maintenance recorder map words for the 2,400 discrete test results each second. The FIG. 3 step 104 optimization leads to FIG. 5, representing the basic steps for determining if the volume of the LRU self-test data requires one or more overlays. Following FIG. 5, step 167, is a determination at step 168 if the self-test discretes fit within available map space. If the 200 words fit, step 169 is performed, and if more LRU's require self-test data recording, step 167 is executed again. If step 169 results in a "no" response, FIG. 5 flow chart performance is completed. However, many units will have a "no" response at step 168 since the self-test data for a minority of LRUs can fill the entire recorder map. In this example, the 200 LRU maintenance recorder words are overlaid at step 170. First, overlays are performed within the LRU, and then with others, similar to that described for FIG. 4 steps 158–166. However, one important distinction at step 170 is that the utilization of LRU self-test complexity levels creates an overlay advantage by associating component board functional failures to circuit board, LRU and system level functions, or hierarchical recording of fault propagation.

LRU component self-test functions can all be recorded into an overlay, supporting reduction of 2,400 discretes to 147, or from 200 to 12¼ maintenance recorder words, respectively, at step 158 in FIG. 4 using the circuit board component function hierarchical level for the example LRU. Note that 147 discretes recorded per second is the sum of 120 component self-test summary discretes (each set if any of its 20 self-test functions fail), seven overlay bits (a coded parameter value set to indicate which of the 120 components are being recorded), and the 20 component self-test function result bits (for any of the 120 components). This 12¼ word overlay may not fit, or produces a "no" decision at representative FIG. 4, step 160. The 12¼ word overlay can then be further shared with another LRU overlay. This attempt, at representative FIG. 4, step 162, can then result in a "no" answer at step 164. While the deletion of one of 2,400 discretes can be performed at representative FIG. 4, step 166, FIG. 5, step 170, alternatively supports deletion of an entire level of LRU self-test data, or removal of the 20 self-test function discretes (for any of the 120 components). Thus, the first pass from FIG. 5, step 170, to step 168 is with 120 discrete bits, or 10 map words, for recording the 120 component self-test function summary results. Step 168 can result in a "no" for these 10 words, and step 170 is then performed a second time. This second pass is through step 170, or representative FIG. 4, steps 158–166.

At step 158 the 120 discretes are overlaid to 11 using the circuit board component hierarchical level for the example LRU: 4 circuit board summary bits (set if any of its 30 components fail), and the overlay consisting of seven coded bits representing which of the 120 components failed. At step 162, after a "no" to step 160, an attempt is made to further share the seven coded bits with other similar LRU components results. At step 166, after a "no" to step 164, the four circuit board discretes remain at the third step 168 attempt. If the LRU is very inexpensive (very low price, failure and removal rates, and test time), step 168 can result in a "no" at the third pass through step 170 (or representative FIG. 4 steps 158–166).

At step 158, the four circuit board discretes are reduced to 3 bits using the circuit board hierarchical level: 1 LRU summary bit (set if any of the four circuit boards fail), and the overlay consisting of two coded bits representing which of the four boards failed. At step 162, after a "no" to step 160, another attempt is made to share the two coded bits with other similar LRU summary bits. At step 166, after a "no" to step 164, the single LRU summary discrete remains, and is either recorded or not at step 168.

The FIG. 5 LRU example, especially with only one self-test discrete recorded, can easily lead to either a "no" at step 142 or a "yes" at step 146, and execution of the alternate preferred methods data optimization feature. For example, the example LRU can have a component self-test function (incorrectly) set per high aircraft vibration levels. This may result in a "no" at step 142 since LRU testing performed off aircraft is normally done without vibration applied. Additionally, actual hardware failures to other component self-test functions can further mask vibration induced failures. Thus, step 142 occurrences will increase the cost (i.e., life cycle cost) of the LRU, and steps 144, 104 and the steps of FIG. 5 are then performed again (to reduce this increased cost). Finally, the recording of the example LRU, 2,400 self-test discretes would support rapid identification of the LRU component self-test function susceptible to vibration.

The example LRU could instead be failing intermittently, and while true hardware degradation is causing this, the recording of only one summary discrete results in off-aircraft end-to-end performance tests to be done repetitively in an attempt to locate the fault. A "yes" at step 146 will often occur for intermittent testing, since each instance can require many hours, or even days of test time. This test time contributes to an increase in LRU (life cycle) cost, leading to step 144, 104 and FIG. 5 performance again. The recording of the 2,400 self-test discretes support dramatically reduced test times since an intermittent LRU failure will now result in the given component functional test to be repeated, and not all of the other LRU end-to-end tests.

The steps of the flowchart of FIG. 4 could also easily be used to construct overlays of other LRU data besides parametric or discrete self-test data. For example, wire testing of the wiring associated with an LRU will also generate an extremely large amount of data. A single LRU can contain 100 input and output signal paths, with each path containing three independent wires, and with each wire often being tested at rates of up to four times per second. The 1200 LRU wire self-tests performed each second require 100 map words, using a discrete bit for each (pass or fail) impedance check. The steps of FIG. 4 could be utilized with little or no modification to construct overlays by "space sharing" multiple wire paths and combining them with wire paths of other LRUs, when needed, to effectively reduce the amount of wire test data that needs to be recorded. In this manner only wire test information relating to critical subsystems of one or more LRUs can be recorded if memory space is limited in the maintenance recorder memory map.

Figure 6:
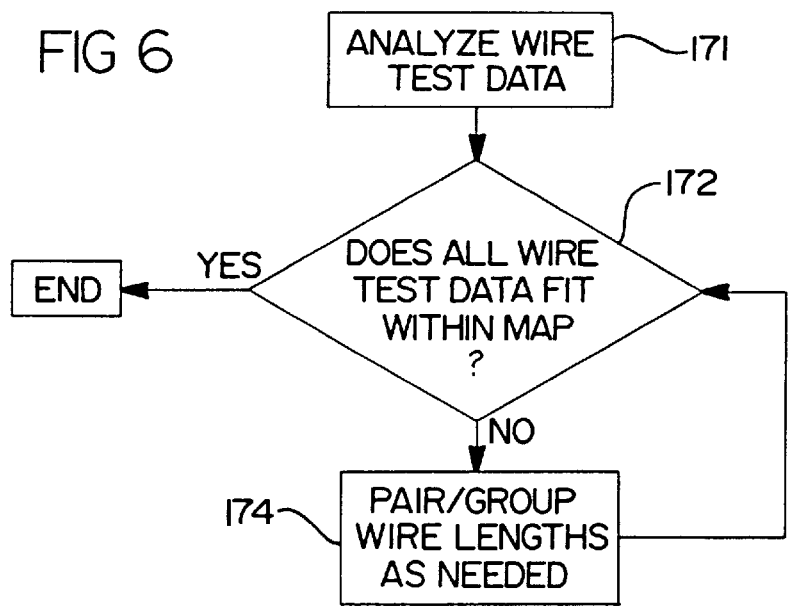
FIG. 6 is a flowchart illustrating an algorithm for analyzing wire test data generated by an LRU and determining if the available wire test data will fit within the recorder memory map.

A simplified flowchart is shown in FIG. 6 representing the basic steps for determining if the wire test information needs to be condensed in an overlay. At step 171, the wire test information is automatically analyzed. At step 172, a determination is made if the wire test data fits within the memory map. If it does, then the information can simply be recorded. If it does not, then various ones of the wire lengths can be paired or grouped, as desired, based on keeping information from those wire groups which are associated with the most critical subsystems of the LRU, as indicated at step 174. Step 174 represents the determinations and actions taken in steps 158–166 of FIG. 4. Another check is then made to determine if the data is of sufficiently small size so as to be recordable on the memory map of the maintenance recorder, as indicated at step 172.

Most important, this methodology supports continual fault data recording optimization. A setting of a discrete bit can represent a failure to many wire paths, after the above execution of FIG. 6. FIG. 3, step 139, will result in a "yes", supporting FIG. 6 execution prior to the following flight since fault isolation can be improved. Thus, following the subsequent flight with wire optimized data, the single fault wire can be properly reported.

Figure 7:
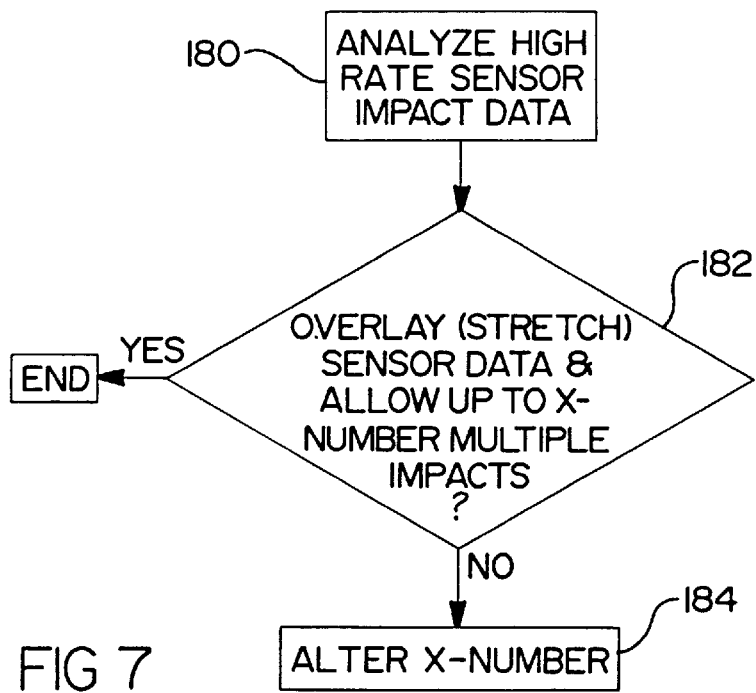
FIG. 7 is a flowchart illustrating an algorithm for monitoring and recording multiple impact data from a sensor on-board the aircraft.

Referring now to FIG. 7, yet another modification of the method shown in FIG. 4 can be employed to compile and record information from one or more sensors, which information might in some instances be too voluminous to record without employing one or more overlays. An example of such an application is the use of a transducer adapted to monitor an aircraft structure for impact assessment. In this instance up to 6000 sensor testing words can be required for representing a 0.5 second structural impact, where the 6000 words of data is achieved through a very high rate of sampling the output of a particular sensor.

At step 180 in the flowchart of FIG. 7, the sensor data is obtained and analyzed. At step 182 overlays are performed, and represent FIG. 4, steps 158–166. Since the 6,000 maintenance recorder words exceed the entire map size, an overlay must be constructed. For example, the 6,000 necessary words (within a one second frame) can be recorded using 100 words (per second) for 60 seconds. Furthermore, other similar sensors can utilize this overlay if necessary. Note that any LRU data requiring very high rates, or a greater rate of data than what fits within the maintenance map, requires step 182 "stretching" for alternate preferred method implementation. At step 182, a determination is also made if the number of impacts that have been recorded has exceeded a predetermined number. The handling of multiple impact occurrences requires a considerable amount of memory space, and the determination at step 182 enables impact information to be ignored if a predetermined number of impacts has already been recorded. Thus, the strongest number of impacts can be chosen for recording. For example, if an impact greater than any of the impacts previously stored occurs, but the number of impacts or "X-number" (where "X" represents the maximum number of impacts) has been exceeded, then the data representing the weakest impact previously stored can be discarded, per recorder apparatus constraints. The number of impacts or "X-number" allowed can then be selected to be larger, shown by a "no" at step 182. Then, for future fault recording and reporting method operations, if it is believed that recording a greater number of impacts will help in isolating or troubleshooting faults occurring during flight, then step 184 is again executed.

It will also be appreciated that the use of overlays does require prioritizing information so that when memory space constraints are encountered, only the most pertinent fault, self-test or other type of data is made available for recording. While this was shown in FIG. 7, the preferred methods of the present invention enable systematic automated reduction of information, for recording purposes, so that when memory space becomes limited only that information most pertinent is presented for recording.

Furthermore, the alternative preferred method supports automatic execution, or continual improvement, of the methods of FIGS. 3–7 using a commercially available PC. This method for improvement is shown in FIG. 8. Similar to that discussed in FIG. 1, aircraft maintenance media 200 can be an optical disc removed from the OQAR 202 following the flight. The disk is then inserted into a PC 204 for automated reporting 206. A Digital Flight Data Management Unit (DFDMU) 208 can be used in the aircraft for alternate preferred method implementation, and either a PCMCIA card or an optical disk can comprise the maintenance media 200. The maintenance media 200 can be removed following the flight of an aircraft and then inserted into the PC 204 for automated reporting. The automated alternate preferred method assessment reporting 206 is shown as step 138 in FIG. 3. If either step 139, 142 or 146 of FIG. 3 result in a "yes", "no" or "yes", respectively, the report recipient 210 can then be informed that the PC 204 is automatically updating the maintenance map.

This maintenance map optimization of FIGS. 4–7 is performed by the PC 204 using the floppy disk application generation system (AGS) file or optical disk configuration file for the DFDMU 208 or OQAR 202, respectively. After the floppy or optical disk 200 is inserted into the DFDMU 208 or OQAR 202, the recorder map is then updated. A result of FIG. 8 performance is the novel use of unique maintenance recorder maps for aircraft within a fleet of the same aircraft type.

Those skilled in the art can now appreciate from the foregoing description that the broad teachings of the present invention can be implemented in a variety of forms. Two examples: (1) either larger memory maps or additional ARINC 573 or 429 maintenance recorder data streams can be utilized as necessary, and (2) during the flight, or prior to the next flight on the ground, the maintenance recorder map can be updated performing data optimization and recording, thus expediting continuous alternate preferred method improvement. Therefore, while this invention has been described in connection with particular examples thereof, the true scope of the invention should not be so limited since other modifications will become apparent to the skilled practitioner upon a study of the drawings, specification and following claims.

What is claimed is:

1. A method for analyzing and recording information relating to the operation of a plurality of line replaceable units (LRUs) of an aircraft for subsequent fault analysis, said method comprising the steps of:
   a) monitoring and storing all available information generated by a plurality of LRUs relating to a plurality of operational parameters of said aircraft;
   b) determining if the information from a first one of said LRUs is of a magnitude which can be recorded in a memory map of an optical quick access recorder (OQAR);
   c) if said information from said first one of said LRUs cannot be recorded within said memory map, then overlaying a hierarchical level of information generated by said first one of said LRUs onto said memory map and determining if said hierarchical level of information fits within said memory map;
   d) if said hierarchical level of information still cannot be recorded onto said memory map, then overlaying said hierarchical level of information with information from a second LRU to produce a further condensed plurality of information and determining if said further condensed plurality of information from said first and second LRUs can be mapped in said memory map of said OQAR; and
   e) if said further condensed plurality of information can be stored on said OQAR, then storing said further condensed plurality of information on said OQAR for subsequent analysis.

2. The method of claim 1, further comprising the steps of:
   generating a first code word for said information generated by said first LRU;
   combining it with a second code word for information generated by said second LRU; and
   recording said code words on said OQAR together with said hierarchical level of information and said information from said second LRU.

3. The method of claim 1, further comprising the step of assigning each one of a subplurality of said information relating to a specific parameter of operation a priority in accordance with its importance to aircraft operation.

4. The method of claim 3, further comprising the step of eliminating one or more of said parameters of operation in accordance with said priority such that least ones of said parameters which are of lesser importance to aircraft operation are eliminated prior to ones of said parameters that are of greater importance.

5. The method of claim 1, further comprising the steps of:
   following the reporting of said stored OQAR information, again performing steps a) through e) in support of continual improvement in reducing no-fault-found incidences with said LRUs of said aircraft.

6. A method for analyzing and recording information relating to the operation of a line replaceable unit (LRU) of an aircraft onto a recording medium for subsequent analysis, wherein the LRU includes a plurality of circuit assemblies, said method comprising the steps of:
   a) monitoring and storing all available information generated by an LRU during operation of an aircraft associated with said LRU;
   b) determining if the information from said LRU is of a volume which can be recorded in a memory map of an optical quick access recorder (OQAR);
   c) if said information does not fit within said memory map, then determining which of said circuit assemblies is generating redundant information and eliminating said redundant information generated by said circuit assemblies, and thereafter creating a first coded overlay word indicating which ones of said circuit assemblies has generated a first condensed plurality of information to be recorded;
   d) again determining if said first condensed plurality of information can be recorded on said memory map of said OQAR; and
   e) if said first condensed plurality of information cannot be recorded on said memory map, then overlaying said first condensed plurality of information with information generated by a second LRU.

7. The method of claim 6, wherein said information generated by said second LRU is condensed into a second plurality of condensed information and assigned a second coded overlay word combined with the first coded overlay word indicating which ones of a plurality of circuit assemblies of said second LRU have generated said second plurality of condensed information; and
   recording said first and second combined coded overlay words, together with said first and second pluralities of condensed information, on said memory map of said OQAR.

8. The method of claim 6, further comprising the steps of:
   determining if said first and second pluralities of condensed information are still too voluminous to record on said memory map of said OQAR;
   if said first and second pluralities of condensed information are still too voluminous to record, then preventing information relating to a predesignated, least important LRU parameter of operation from being recorded to further reduce the amount of information being generated by said at least one LRU for recording.

9. The method of claim 8, further comprising the steps of:
   designating a plurality of LRU parameters of operation which are to be considered for elimination in the event information from said LRU is too voluminous to record on said OQAR, and assigning each said parameter a priority of importance from least important to most important; and
   eliminating ones of said parameters in the event further condensing of said information generated by said at least one LRU is required in accordance with said least important to said most important designations.

10. The method of claim 6, further comprising the steps of:
    following the reporting of said stored OQAR information, again performing steps a) through e) in support of continual improvement in reducing the incidence of no-fault-found occurrences with said LRUs.

11. A method for analyzing and recording information generated by a line replaceable unit (LRU) of an aircraft onto a recording medium for subsequent analysis, wherein said information comprises information relating to a plurality of distinct operational parameters of said aircraft, said method comprising the steps of:
    a) prioritizing at least a sub-plurality of said operational parameters of information generated by said LRU from least important to most important;
    b) analyzing said information relating to said sub-plurality of operational parameters;
    c) determining if said information is of a volume which can be recorded in a memory map of an optical quick access recorder (OQAR);

d) if said information is too voluminous to be recorded within said memory map, then determining if any of said information is redundant;

e) if any of said information is redundant, then eliminating a redundant portion of said information to create a condensed plurality of information and creating an overlay word indicative of that portion of said information which has been retained for recording;

f) determining if said condensed plurality of information to be recorded can be recorded in said memory map of said OQAR;

g) if said condensed plurality of information cannot be recorded on said memory map, then overlaying said condensed information with information generated by a second LRU to create a further condensed plurality of information;

h) determining if said further condensed plurality of information can be recorded in said memory map of said OQAR; and i) if said further condensed plurality of information is still too voluminous to be recorded in said memory map, then eliminating information relating to a least most important one of said operational parameters from at least one of said LRUs and again attempting to record said further condensed plurality of information in said memory map.

12. The method of claim 11, further comprising the steps of:

determining if said further condensed plurality of information still is too voluminous to be recorded in said memory may; and if said further condensed plurality of information is still too voluminous to be recorded, eliminating information from said second LRU relating to a second operational parameter which is of greater importance than said least most important operational parameter.

13. The method of claim 11, further comprising the steps of:

following the reporting of said stored OQAR information, again performing steps a) through i) in support of continual improvement in the reduction of no-fault-found occurrences associated with said LRUs.

* * * * *